(12) United States Patent
Takashima et al.

(10) Patent No.: US 12,398,244 B2
(45) Date of Patent: Aug. 26, 2025

(54) POLYMER MATERIAL AND METHOD FOR PRODUCING SAME, AND POLYMER COMPATIBILIZING AGENT

(71) Applicant: Osaka University, Suita (JP)

(72) Inventors: Yoshinori Takashima, Suita (JP); Akira Harada, Suita (JP); Hiroyasu Yamaguchi, Suita (JP); Motofumi Osaki, Suita (JP); Ryohei Ikura, Suita (JP); Hiroki Tamura, Suita (JP)

(73) Assignee: The University of Osaka, Osaka (JP)

( * ) Notice: Subject to any disclaimer, the term of this patent is extended or adjusted under 35 U.S.C. 154(b) by 701 days.

(21) Appl. No.: 17/641,088

(22) PCT Filed: Sep. 4, 2020

(86) PCT No.: PCT/JP2020/033673
§ 371 (c)(1),
(2) Date: Mar. 7, 2022

(87) PCT Pub. No.: WO2021/045215
PCT Pub. Date: Mar. 11, 2021

(65) Prior Publication Data
US 2022/0332859 A1 Oct. 20, 2022

(30) Foreign Application Priority Data

Sep. 5, 2019 (JP) .................... 2019-162442

(51) Int. Cl.
| | |
|---|---|
| *C08G 83/00* | (2006.01) |
| *C08F 12/08* | (2006.01) |
| *C08F 212/08* | (2006.01) |
| *C08F 220/12* | (2006.01) |
| *C08F 220/18* | (2006.01) |
| *C08F 220/58* | (2006.01) |
| *C08L 33/26* | (2006.01) |

(52) U.S. Cl.
CPC ............ *C08G 83/007* (2013.01); *C08F 12/08* (2013.01); *C08F 212/08* (2013.01); *C08F 220/12* (2013.01); *C08F 220/1802* (2020.02); *C08F 220/58* (2013.01); *C08L 33/26* (2013.01)

(58) Field of Classification Search
None
See application file for complete search history.

(56) References Cited

U.S. PATENT DOCUMENTS

| | | | |
|---|---|---|---|
| 6,100,329 A | 8/2000 | Gibson et al. | |
| 2015/0361209 A1* | 12/2015 | Masuhara | ........... C08B 37/0015 525/54.31 |
| 2021/0155731 A1 | 5/2021 | Harada et al. | |
| 2023/0192931 A1 | 6/2023 | Harada et al. | |

FOREIGN PATENT DOCUMENTS

| | | | | |
|---|---|---|---|---|
| EP | 1734066 A1 | * | 12/2006 | ............. B01J 20/26 |
| JP | 2003-261637 A | | 9/2003 | |
| JP | 2006-241396 A | | 9/2006 | |
| JP | 2007-046013 A | | 2/2007 | |
| JP | 2009-051994 A | | 3/2009 | |
| JP | 2010-159345 A | | 7/2010 | |
| JP | 2012-188524 A | | 10/2012 | |
| JP | 2012-224559 A | | 11/2012 | |
| JP | 2016-89175 A | | 5/2016 | |
| JP | 2018-030928 A | | 3/2018 | |
| JP | 2018203825 A | * | 12/2018 | |
| JP | 2019-011462 A | | 1/2019 | |
| WO | 2018/159791 A1 | | 9/2018 | |
| WO | 2018/207934 A1 | | 11/2018 | |

OTHER PUBLICATIONS

Machine translation of JP 2018-203825 (no date).*
"Rupturing Polymer Micelles with Cyclodextrins" authored by Joseph et al. and published in Langmuir (2007) 23, 460-466.*
"Bis(pseudopolyrotaxane)s Possessing Copper(II) Ions Formed by Different Polymer Chains and Bis(β-Cyclodextrin)s Bridged with a 2,2'Bipyridine-4-4'-dicarboxy Tether" authored by Liu et al. and published Macromolecules (2002) 35, 9934-9938.*
"Solid State Polycondensation within Cyclodextrin Channels Leading to Water-soluble Polyamide Rotaxanes" authored by Wenz et al., and published in Tetrahedron (1997) 53(45) 15575-15592.*
Office Action dated Oct. 10, 2023, issued for the corresponding JP patent application No. 2021-544065 and English translation thereof.
Office Action mailed May 9, 2023, issued for the correpoding JP Patent Application No. 2021-544065 and English translation thereof.

* cited by examiner

*Primary Examiner* — Marc S Zimmer
(74) *Attorney, Agent, or Firm* — Troutman Pepper Locke LLP; James E. Armstrong, IV; Nicholas J. DiCeglie, Jr.

(57) ABSTRACT

Provided are a macromolecular material comprising two or more types of polymers, which are less likely to be separated, and having excellent mechanical properties, a method for producing the same, and a macromolecular compatibilizing agent. The macromolecular material according to the present invention comprises a first macromolecular compound having a ring host group, and a second macromolecular compound free of the host group, and the second macromolecular compound penetrates through the ring of the host group in a skewering manner. The method for producing the macromolecular material according to the present invention comprises polymerizing a polymerizable monomer in the presence of the first macromolecular compound. The macromolecular compatibilizing agent according to the present invention comprises a macromolecular compound having a ring host group.

7 Claims, 8 Drawing Sheets

1: First macromolecular material
2: Second macromolecular material
10: Host group

POLYMER MATERIAL AND METHOD FOR PRODUCING SAME, AND POLYMER COMPATIBILIZING AGENT

TECHNICAL FIELD

The present invention relates to a macromolecular material, a method for producing the same, and a macromolecular compatibilizing agent.

BACKGROUND ART

Macromolecular materials are widely applied to, for example, films, adhesives, coating agents, molding raw materials, and paints, and are indispensable functional materials in the fields of electronic components, automotive components, packaging materials, and the like. In particular, in recent years, there has been an increasing demand for products with higher performance and accuracy in various fields. For this reason, macromolecular materials are required to have higher performance and functionality, and research and development of various new macromolecular materials is being actively carried out.

To provide macromolecular materials having high dynamic strength and imparted with self-healing properties and shape memory properties, for example, PTL 1 or PTL 2 has proposed a technique related to the precise control of macromolecular structures using host-guest interactions with clathrate complexes.

CITATION LIST

Patent Literature

PTL 1: WO2016/163550
PTL 2: WO2018/159791

SUMMARY OF INVENTION

Technical Problem

In order to further improve the functionality of macromolecular materials, for example, it is known that the use of two different types of macromolecular compounds is also an effective means for exploiting the characteristics of both macromolecular compounds. Examples are various polymers, such as hybrid polymers, blended polymers, and polymer composites. Macromolecular compounds that are highly compatible with each other can be combined to give macromolecular materials with added functionality. In many cases, however, there is a problem that different types of polymers are less compatible with each other. This made it difficult for them to mix with each other, which sometimes resulted in lower performance than with individual polymers alone, making it difficult for them to function as designed.

The present invention was made in view of these circumstances in the art. An object of the invention is to provide a macromolecular material comprising two or more types of polymers, which are less likely to be separated, and having excellent mechanical properties, a method for producing the same, and a macromolecular compatibilizing agent.

Solution to Problem

The present inventors conducted extensive research to achieve the object, and found that the object can be achieved by using a macromolecular compound having a host group that allows penetration of the macromolecular compound. The present inventors then completed the invention.

Specifically, the present invention includes, for example, the subject matter described in the following items.

Item 1. A macromolecular material comprising a first macromolecular compound having a ring host group, and a second macromolecular compound free of the host group,
    the second macromolecular compound penetrating through the ring of the host group in a skewering manner.

Item 2. The macromolecular material according to Item 1, wherein the host group is a monovalent group formed by removing one hydrogen atom or hydroxy group from a cyclodextrin derivative, and
    the cyclodextrin derivative has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group.

Item 3. The macromolecular material according to Item 1 or 2, wherein a main chain of the first macromolecular compound and a main chain of the second macromolecular compound have the same or different structures.

Item 4. A method for producing the macromolecular material according to any one of Items 1 to 3, comprising polymerizing a polymerizable monomer in the presence of the first macromolecular compound.

Item 5. The method for producing the macromolecular material according to Item 4, wherein the polymerizable monomer penetrates through the ring of the host group in a skewering manner while being polymerized.

Item 6. A method for producing the macromolecular material according to any one of Items 1 to 3, comprising mixing the first macromolecular compound and the second macromolecular compound, thereby allowing the second macromolecular compound to penetrate through the ring of the host group in a skewering manner.

Item 7. A macromolecular compatibilizing agent comprising a macromolecular compound having a ring host group.

Item 8. The macromolecular compatibilizing agent according to Item 7, wherein the host group is a monovalent group formed by removing one hydrogen atom or hydroxy group from a cyclodextrin derivative, and
    the cyclodextrin derivative has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group.

Advantageous Effects of Invention

The macromolecular material of the present invention comprises two or more types of polymers, which are less likely to be separated, and has excellent mechanical properties.

The macromolecular compatibilizing agent of the present invention is suitable as a compatibilizing agent for forming a macromolecular material comprising two or more different polymers.

DESCRIPTION OF EMBODIMENTS

Figure 1:
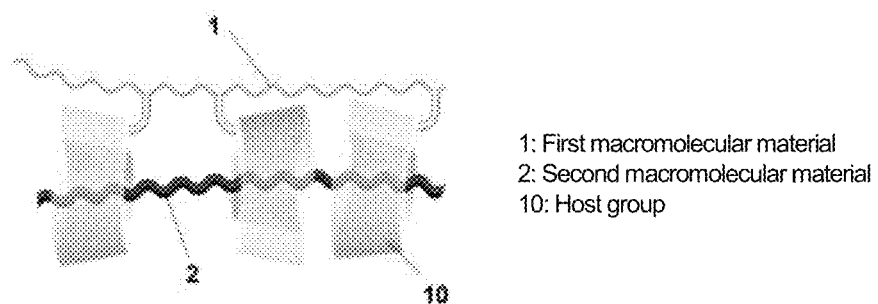
FIG. 1 schematically shows part of the structure of the macromolecular material of the present invention.

Below, embodiments of the present invention are described in detail. The terms "comprise," "contain," and "include" in the present specification include the concepts of "comprise," "contain," "include," "consist essentially of," and "consist of."

1. Macromolecular Material

The macromolecular material of the present invention comprises a first macromolecular compound having a ring host group, and a second macromolecular compound free of the host group, and the second macromolecular compound penetrates through the ring of the host group in a skewering manner.

First Macromolecular Compound

The first macromolecular compound has a plurality of ring host groups in its molecule. For example, the host groups can be chemically bonded (in particular, covalently bonded) to the end of the side chain and/or main chain of the first macromolecular compound.

In the first macromolecular compound, the type of host group is not particularly limited, as long as it is a cyclic molecule, in particular, as long as it allows the penetration of a second macromolecular compound, described later.

For example, the host group is preferably a monovalent group formed by removing one hydrogen atom or hydroxy group from a cyclodextrin derivative. In this case, the cyclodextrin derivative preferably has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group. That is, the cyclodextrin derivative refers to a molecule with a structure formed such that a cyclodextrin molecule is substituted with a different organic group. However, the cyclodextrin derivative has at least one hydrogen atom or one hydroxy group, and preferably at least one hydroxy group. In the present invention, the host group is not limited to a monovalent group, and may be, for example, a divalent group.

In the present specification, "at least one group selected from the group consisting of a hydrocarbon group, an acyl group, and —CONHR wherein R represents a methyl group or an ethyl group" may be referred to as "a hydrocarbon group etc." for convenience.

Just to note, "cyclodextrin" in the present specification refers to at least one member selected from the group consisting of α-cyclodextrin, β-cyclodextrin, and γ-cyclodextrin. Therefore, the cyclodextrin derivative is at least one member selected from the group consisting of an α-cyclodextrin derivative, a β-cyclodextrin derivative, and a γ-cyclodextrin derivative.

In the first macromolecular compound, the host group preferably contains a monovalent group formed by removing one hydrogen atom or hydroxy group from a γ-cyclodextrin derivative because the second macromolecular compound can easily penetrate. In the first macromolecular compound, when the host group contains a monovalent group formed by removing one hydrogen atom or hydroxy group from a γ-cyclodextrin derivative, the content ratio thereof is preferably 90 mol % or more, more preferably 99 mol % or more, and may be 100 mol %, based on the total amount of the host groups.

The host group is a monovalent group formed by removing one hydrogen atom or hydroxy group from a cyclodextrin derivative; however, the hydrogen atom or hydroxy group removed from the cyclodextrin derivative may be of any site of the cyclodextrin or cyclodextrin derivative.

When the total number of hydroxy groups in a single molecule of a cyclodextrin is N, N of α-cyclodextrin is 18, N of β-cyclodextrin is 21, and N of γ-cyclodextrin is 24.

If the host group is a monovalent group formed by removing one "hydroxy group" from a cyclodextrin derivative, in the cyclodextrin derivative, the maximum number of hydroxy groups whose hydrogen atoms are replaced with a hydrocarbon group etc. is N−1 per molecule of cyclodextrin. If the host group is a monovalent group formed by removing one "hydrogen atom" from a cyclodextrin derivative, in the cyclodextrin derivative, the maximum number of hydroxy groups whose hydrogen atoms can be replaced with a hydrocarbon group etc., is N per molecule of cyclodextrin.

The host group preferably has a structure such that the hydrogen atoms of at least 70% of the total number of hydroxy groups per molecule of cyclodextrin are replaced with a hydrocarbon group etc. In this case, the second macromolecular compound can easily penetrate. The host group more preferably has a structure such that the hydrogen atoms of at least 80% of the total number of hydroxy groups per molecule of cyclodextrin are replaced with a hydrocarbon group etc.; and particularly preferably has a structure such that the hydrogen atoms of at least 90% of the total number of hydroxy groups per molecule of cyclodextrin are replaced with a hydrocarbon group etc.

The host group preferably has a structure such that the hydrogen atoms of at least 13 hydroxy groups out of the total number of hydroxy groups per molecule of α-cyclodextrin are replaced with a hydrocarbon group etc. The host group more preferably has a structure such that the hydrogen atoms of at least 15 hydroxy groups out of the total number of hydroxy groups per molecule of α-cyclodextrin are replaced with a hydrocarbon group etc.; and particularly preferably has a structure such that the hydrogen atoms of 17 hydroxy groups out of the total number of hydroxy groups per molecule of α-cyclodextrin are replaced with a hydrocarbon group etc.

The host group preferably has a structure such that the hydrogen atoms of at least 15 hydroxy groups out of the total number of hydroxy groups per molecule of β-cyclodextrin are replaced with a hydrocarbon group etc. The host group more preferably has a structure such that the hydrogen atoms of at least 17 hydroxy groups out of the total number of hydroxy groups per molecule of β-cyclodextrin are replaced with a hydrocarbon group etc.; and particularly preferably has a structure such that the hydrogen atoms of at least 19 hydroxy groups out of the total number of hydroxy groups per molecule of β-cyclodextrin are replaced with a hydrocarbon group etc.

The host group preferably has a structure such that the hydrogen atoms of at least 17 hydroxy groups out of the total number of hydroxy groups per molecule of γ-cyclodextrin are replaced with a hydrocarbon group etc. The host group more preferably has a structure such that the hydrogen atoms of at least 19 hydroxy groups out of the total number of hydroxy groups per molecule of γ-cyclodextrin are replaced with a hydrocarbon group etc.; and particularly preferably has a structure such that the hydrogen atoms of at least 21 hydroxy groups out of the total number of hydroxy groups per molecule of γ-cyclodextrin are replaced with a hydrocarbon group etc.

When the host group has two or more hydrocarbon groups, all of them may be the same, or some of them may be different.

The host group is preferably a monovalent group formed by removing one hydrogen atom or hydroxy group from a γ-cyclodextrin derivative. In this case, since the openings of the host group have a sufficiently large diameter, the second macromolecular compound, described later, can easily penetrate through the host group in a skewering manner, and the target macromolecular material can be easily obtained.

In the cyclodextrin derivative, the type of hydrocarbon group is not particularly limited. Examples of the hydrocarbon group include an alkyl group, an alkenyl group, and an alkynyl group.

The number of carbon atoms in the hydrocarbon group is not particularly limited. For example, the number of carbon atoms in the hydrocarbon group is preferably 1 to 4.

Specific examples of hydrocarbon groups having 1 to 4 carbon atoms include a methyl group, an ethyl group, an n-propyl group, an isopropyl group, and a butyl group. When the hydrocarbon group is a propyl group or a butyl group, the hydrocarbon group may be linear or branched.

The hydrocarbon group may be substituted, as long as the effects of the present invention are not impaired.

In the cyclodextrin derivative, examples of the acyl group include an acetyl group, a propionyl group, and a formyl group. The acyl group may be further substituted. The acyl group is preferably an acetyl group because host-guest interactions are easily formed, and a macromolecular material having excellent toughness and strength can be easily obtained.

In the cyclodextrin derivative, —CONHR wherein R represents a methyl group or an ethyl group is a methyl carbamate group or an ethyl carbamate group. —CONHR is preferably an ethyl carbamate group because host-guest interactions are easily formed.

In the cyclodextrin derivative, the hydrocarbon group etc. is preferably a $C_{1-4}$ alkyl group or an acyl group, more preferably a methyl group or an acyl group, even more preferably a methyl group, an acetyl group, or a propionyl group; and particularly preferably a methyl group or an acetyl group.

The first macromolecular compound is, for example, a macromolecular compound in which a structural unit having the host group and a structural unit free of the host group are arranged regularly or irregularly. Hereinafter, in the first macromolecular compound, the structural unit having the host group is referred to as "structural unit 1A," and the structural unit free of the host group is referred to as "structural unit 1B."

Structural unit 1A is not particularly limited, as long as it has the host group. For example, structural units derived from known host group-containing polymerizable monomers (e.g., the host group-containing polymerizable monomer disclosed in PTL 2 mentioned above) can be widely applied. The type of host group-containing polymerizable monomer is not particularly limited, as long as, for example, it has the host group and a polymerizable functional group. Specific examples of polymerizable functional groups include radically polymerizable functional groups such as an alkenyl group and a vinyl group, as well as —OH, —SH, —NH₂, —COOH, —SO₃H, —PO₄H, an isocyanate group, and an epoxy group (glycidyl group).

Specific examples of the host group-containing polymerizable monomer include vinyl compounds having a radically polymerizable functional group to which a host group is bonded. Examples of radically polymerizable functional groups include groups containing a carbon-carbon double bond. Specific examples include an acryloyl group (CH₂=CH(CO)—) and a methacryloyl group (CH₂=CCH₃(CO)—), as well as a styryl group, a vinyl group, and an allyl group. These groups containing a carbon-carbon double bond may be further substituted to the extent that the radical polymerization properties are not interfered.

Specific examples of the host group-containing polymerizable monomer include vinyl polymerizable monomers having the host group. For example, the host group-containing vinyl monomer is a compound represented by the following formula (h1):

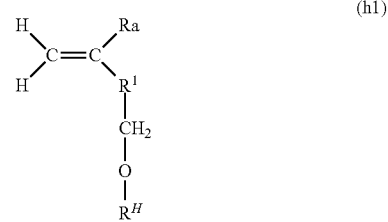

In formula (h1), Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, a thioalkoxy group optionally having at least one substituent, an alkyl group optionally having at least one substituent, an amino group optionally having one substituent, an amide group optionally having one substituent, an aldehyde group, and a carboxyl group.

Alternatively, the host group-containing polymerizable monomer is, for example, a compound represented by the following formula (h2):

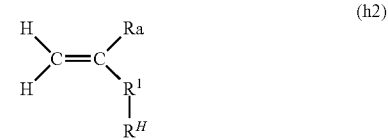

In formula (h2), Ra, $R^H$, and $R^1$ are respectively synonymous with Ra, $R^H$, and $R^1$ in formula (h1).

Further, the host group-containing polymerizable monomer is, for example, a compound represented by the following formula (h3):

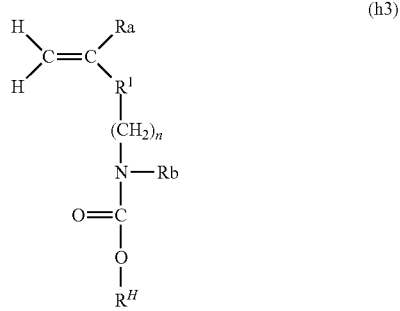

(h3)

In formula (h3), Ra, $R^H$, and $R^1$ are respectively synonymous with Ra, $R^H$, and $R^1$ in formula (h1). n is an integer of 1 to 20, preferably 1 to 10, and more preferably 1 to 5. Rb represents hydrogen or a $C_{1-20}$ alkyl group (preferably a $C_{1-10}$ alkyl group, and more preferably a $C_{1-6}$ alkyl group).

Host group $R^H$ in the host group-containing polymerizable monomers represented by formulas (h1), (h2), and (h3) is an example of a monovalent group formed by removing one hydroxy group from a cyclodextrin derivative.

Moreover, the host group-containing polymerizable monomer may be one of the compounds represented by formulas (h1), (h2), and (h3) alone, or may contain two or more of them. In this case, Ra in formulas (h1), (h2), and (h3) are the same or different in some cases. Similarly, $R^H$ in formulas (h1), (h2), and (h3) are the same or different in some cases, and $R^1$ in formulas (h1), (h2), and (h3) are the same or different in some cases.

The substituents defined in formulas (h1) to (h3) are not particularly limited. Examples of the substituents include a $C_{1-20}$ alkyl group, a $C_{2-20}$ alkynyl group, a $C_{2-20}$ alkynyl group, a halogen atom, a carboxyl group, a carbonyl group, a sulfonyl group, a sulfone group, and a cyano group.

In formulas (h1) to (h3), when $R^1$ is a divalent group formed by removing one hydrogen atom from an amino group optionally having one substituent, the nitrogen atom of the amino group can be bonded to the carbon atom of the C═C double bond.

In formulas (h1) to (h3), when $R^1$ is a divalent group formed by removing one hydrogen atom from an amide group optionally having one substituent, the carbon atom of the amide group can be bonded to the carbon atom of the C═C double bond.

In formulas (h1) to (h3), when $R^1$ is a divalent group formed by removing one hydrogen atom from an aldehyde group, the carbon atom of the aldehyde group can be bonded to the carbon atom of the C═C double bond.

In formulas (h1) to (h3), when $R^1$ is a divalent group formed by removing one hydrogen atom from a carboxyl group, the carbon atom of the carboxyl group can be bonded to the carbon atom of the C═C double bond.

The host group-containing polymerizable monomers represented by formulas (h1) to (h3) are preferably, for example, (meth)acrylic acid ester derivatives (i.e., $R^1$ is —COO—) or (meth)acrylamide derivatives (i.e., $R^1$ is —CONH— or —CONR—, and R is synonymous with the substituent mentioned above). R in —CONR— is, for example, preferably a $C_{1-20}$ alkyl group, more preferably a $C_{1-10}$ alkyl group, and particularly preferably a $C_{1-6}$ alkyl group.

In the present specification, "(meth)acrylic" means "acrylic" or "methacrylic," "(meth)acrylate" means "acrylate" or "methacrylate," and "(meth)allyl" means "allyl" or "metallyl."

In the present invention, specific examples of the host group-containing polymerizable monomer include compounds represented by the following formulas (h1-7), (h1-8), and (h1-9).

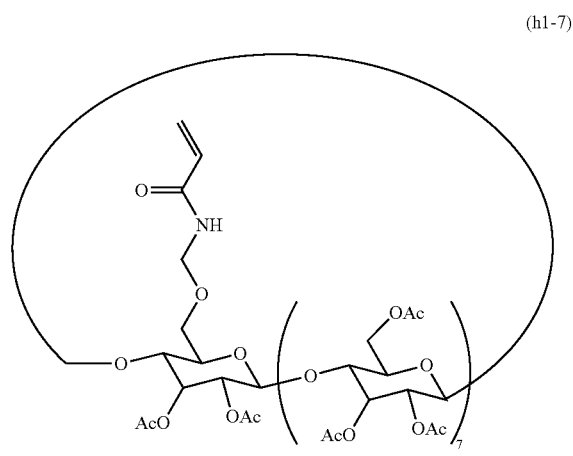

(h1-7)

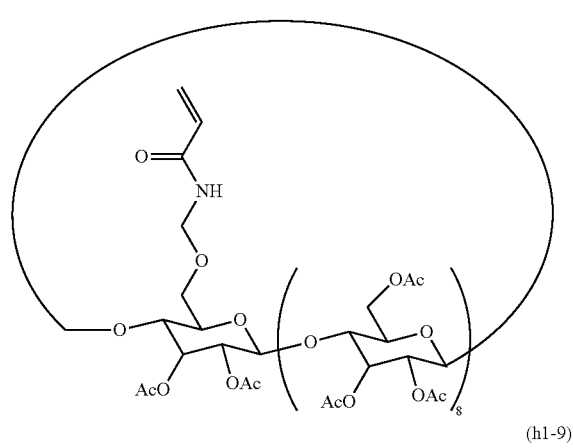

(h1-8)

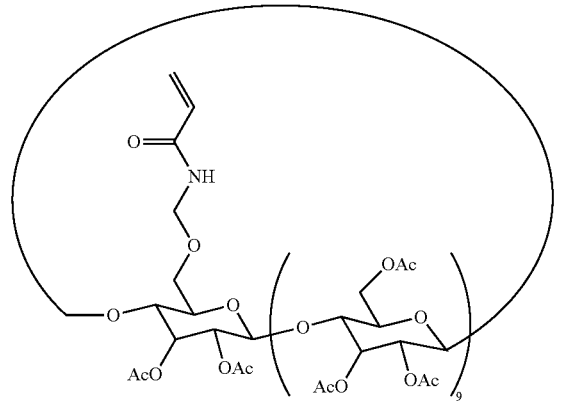

(h1-9)

In the compounds represented by formulas (h1-7), (h1-8), and (h1-9), $R^1$ in formula (h1) is —CONH—, and each has a host group formed by removing one hydroxy group from an α-cyclodextrin derivative, a β-cyclodextrin derivative, or a γ-cyclodextrin derivative. Further, in all of these compounds, the hydrogen atoms of N−1 hydroxy groups in each cyclodextrin derivative are replaced with an acetyl group ("Ac" in each formula).

The method for producing the host group-containing polymerizable monomer is not particularly limited. For example, know production methods can be widely used. For example, a production method similar to the method for producing a host group-containing polymerizable monomer disclosed in PTL 2 mentioned above (specifically, the method for producing a host group-containing vinyl monomer or the method for producing a host group-containing non-vinyl monomer) can be used.

As structural unit 1B, structural units derived from various polymerizable monomers that are copolymerizable with the host group-containing polymerizable monomer can be widely applied. Such polymerizable monomers do not contain host groups. Hereinafter, the polymerizable monomer that can form structural unit 1B is referred to as "polymerizable monomer 1B."

Examples of polymerizable monomer 1B include various vinyl polymerizable monomers. Examples of vinyl polymerizable monomers include (meth)acrylic acid, (meth)acrylic ester, (meth)acrylamide or derivatives thereof, and styrene monomers. Specific examples of vinyl polymerizable monomers include a compound represented by the following formula (a1):

(a1)

In formula (a1), Ra represents a hydrogen atom or a methyl group, and $R^3$ represents a halogen atom, a hydroxy group, a thiol group, an amino group optionally having one substituent or a salt thereof, a carboxylic acid ester or a salt thereof, an amide group optionally having at least one substituent or a salt thereof, or a phenyl group optionally having at least one substituent.

In formula (a1), when $R^3$ is a carboxylic acid ester, examples include carboxyl groups formed by replacing the hydrogen atoms of carboxyl groups with a $C_{1-20}$ hydrocarbon group, a hydroxyalkyl group (e.g., a hydroxymethyl group, a 1-hydroxyethyl group, or a 2-hydroxyethyl group), methoxy polyethylene glycol (the number of units of ethylene glycol is 1 to 20, preferably 1 to 10, and particularly preferably 2 to 5), ethoxy polyethylene glycol (the number of units of ethylene glycol is 1 to 20, preferably 1 to 10, and particularly preferably 2 to 5), or the like. The number of carbon atoms in the $C_{1-20}$ hydrocarbon group is preferably 1 to 15, and more preferably 2 to 10. The hydrocarbon group may be linear or branched.

In formula (a1), when $R^3$ is an amide group having at least one substituent, i.e., secondary amide or tertiary amide, examples include amide groups formed such that one or two of the hydrogen atoms of primary amide are each independently replaced with a $C_{1-20}$ hydrocarbon group or a hydroxyalkyl group (e.g., a hydroxymethyl group, a 1-hydroxyethyl group, or a 2-hydroxyethyl group). The number of carbon atoms in the $C_{1-20}$ hydrocarbon group is preferably 1 to 15, and more preferably 2 to 10. The hydrocarbon group may be linear or branched.

Specific examples of the monomer represented by formula (a1) include (meth)acrylic acid, allylamine, maleic anhydride, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, n-octyl (meth)acrylate, N,N-dimethyl(meth)acrylamide, N,N-diethylacrylamide, N-isopropyl(meth)acrylamide, N-hydroxymethyl(meth)acrylamide, N-hydroxymethyl (meth)acrylate, 2-hydroxyethyl(meth)acrylamide, 2-hydroxyethyl(meth)acrylate, ethoxy-diethylene glycol acrylate, methoxy-triethylene glycol acrylate, methoxy-polyethylene glycol acrylate, and styrene. These can be used singly or in a combination of two or more.

In addition to the compound represented by formula (a1), examples of polymerizable monomer 1B include diene compounds. Specific examples of diene compounds include isoprene and 1,3-butadiene.

The first macromolecular compound may be a random polymer, a block polymer, or an alternating copolymer. In general, the first macromolecular compound can be a random polymer. The first macromolecular compound may have a crosslinked structure or a branched structure; however, from the standpoint that the second macromolecular compound, described later, can easily penetrate through the ring of the host group in a skewering manner, the first macromolecular compound preferably has a linear structure or a non-crosslinked structure.

In the first macromolecular compound, the content ratio of host groups is not particularly limited. For example, based on the total amount of structural unit 1A and structural unit 1B, the content ratio of structural unit 1A (structural unit having host groups) can be set to 0.01 to 10 mol %. In this case, in the macromolecular material, the second macromolecular compound can easily penetrate through the host groups. As a result, the first macromolecular compound and the second macromolecular compound are less likely to be separated, and the mechanical properties of the macromolecular material tend to increase. Based on the total amount of structural unit 1A and structural unit 1B, the content ratio of structural unit 1A is preferably 0.05 mol % or more, more preferably 0.1 mol % or more, even more preferably 0.2 mol % or more, and particularly preferably 0.5 mol % or more. Further, based on the total amount of structural unit 1A and structural unit 1B, the content ratio of structural unit 1A is preferably 30 mol % or less, more preferably 20 mol % or less, even more preferably 15 mol % or less, and particularly preferably 10 mol % or less.

The molecular weight (e.g., weight average molecular weight) of the first macromolecular compound is not particularly limited, and can be, for example, in a range equivalent to the molecular weight of macromolecular compounds obtained by ordinary radical polymerization.

The first macromolecular compound may contain structural units other than structural unit 1A and structural unit 1B, as long as the effects of the present invention are not impaired. When the first macromolecular compound contains structural units other than structural unit 1A and structural unit 1B, the content of such structural units can be set to 5 mass % or less, preferably 1 mass % or less, more preferably 0.1 mass % or less, and particularly preferably 0.05 mass % or less, based on the total mass of the first macromolecular compound.

The method for producing the first macromolecular compound is not particularly limited, and methods for producing known macromolecular compounds can be widely used (e.g., the polymerization reaction disclosed in PTL 2 mentioned above can be used). For example, the first macromolecular compound can be produced by polymerizing a polymerizable monomer mixture containing the host group-containing polymerizable monomer and polymerizable monomer 1B. The polymerization method is not particularly limited. For example, known radical polymerization methods can be widely used. The polymerization mode can be bulk polymerization, solution polymerization, dispersion polymerization, suspension polymerization, precipitation polymerization, or the like, and is not particularly limited.

In the polymerizable monomer mixture containing the host group-containing polymerizable monomer and polymerizable monomer 1B, the proportion of both monomers is not particularly limited. For example, based on the total amount of the host group-containing polymerizable monomer and polymerizable monomer 1B, the content ratio of the host group-containing polymerizable monomer can be set to 0.01 to 10 mol %. In this case, in the resulting macromolecular material, the second macromolecular compound can easily penetrate through the host groups. As a result, the first macromolecular compound and the second macromolecular compound are less likely to be separated, and the mechanical properties of the macromolecular material tend to increase. Based on the total amount of the host group-containing polymerizable monomer and polymerizable monomer 1B, the content ratio of the host group-containing polymerizable monomer is preferably 0.05 mol % or more, more preferably 0.1 mol % or more, even more preferably 0.2 mol % or more, and particularly preferably 0.5 mol % or more. Further, based on the total amount of the host group-containing polymerizable monomer and polymerizable monomer 1B, the content ratio of the host group-containing polymerizable monomer is preferably 30 mol % or less, more preferably 20 mol % or less, even more preferably 15 mol % or less, and particularly preferably 10 mol % or less.

A polymerization initiator can be used in the method for producing the first macromolecular compound. Examples of the polymerization initiator include ammonium persulfate (hereinafter also referred to as "APS"), azobisisobutyronitrile (hereinafter also referred to as "AIBN"), 2,2'-azobis[2-(2-imidazolin-2-yl)propane]dihydrochloride (hereinafter also referred to as "VA-044"), 1,1'-azobis(cyclohexanecarbonitrile), di-tert-butyl peroxide, tert-butyl hydroperoxide, benzoyl peroxide, and photopolymerization initiators (Irgacure (registered trademark) series). The polymerization initiator can be suitably selected depending on the polymerization mode and polymerization reactivity.

In the method for producing the first macromolecular compound, a solvent may be used or may not be used in the polymerization reaction. When a solvent is used, the type of solvent is not particularly limited. The amount of solvent used is also not particularly limited.

Second Macromolecular Compound

The second macromolecular compound is a macromolecular compound that is free of the host group, and that can penetrate through the ring of the host group in a skewering manner.

When the second macromolecular compound is viewed as a linear or rod shape, the maximum diameter of the cross-section of the second macromolecular compound is less than the diameter of the openings of the host group at both ends.

The type of second macromolecular compound is not particularly limited, as long as it can penetrate through the ring of the host group. Examples of the second macromolecular compound include vinyl resins, urethane resins, silicon resins (e.g., polydimethylsiloxane), epoxy resins, polyester resins, polycarbonate resins, polyamide resins, polyimide resins, nylon resins, phenol resins, melamine resins, and urea resins.

When the second macromolecular compound is a vinyl resin, examples of the vinyl resin include polymers of various vinyl monomers. Specific examples of the vinyl resin include polyolefin resins, such as polyethylene and polypropylene; styrene resins, such as polystyrene; acrylic resins, such as poly(meth)acrylic acid and poly(meth)acrylic acid ester; and other resins, such as polyvinyl chloride, polyvinylidene chloride, polyisobutylene, and polybutadiene.

In particular, when the second macromolecular compound is a vinyl resin, the vinyl monomer for forming the vinyl resin can be, for example, the compound represented by formula (a1). In particular, preferable examples of the vinyl monomer for forming the vinyl resin of the second macromolecular compound include (meth)acrylic acid, allylamine, maleic anhydride, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth) acrylate, n-octyl (meth)acrylate, N,N-dimethyl(meth)acrylamide, N,N-diethylacrylamide, N-isopropyl(meth)acrylamide, N-hydroxymethyl(meth)acrylamide, N-hydroxymethyl (meth)acrylate, 2-hydroxyethyl(meth)acrylamide, 2-hydroxyethyl(meth)acrylate, ethoxy-diethylene glycol acrylate, methoxy-triethylene glycol acrylate, methoxy-polyethylene glycol acrylate, and styrene. These can be used singly or in a combination of two or more.

When the second macromolecular compound is a urethane resin, examples of the urethane resin include resins containing structural units contained in known urethane resins can be widely applied. Specifically, a urethane bond-containing structural unit can be used. The urethane bond-containing structural unit is not particularly limited, and examples include a structural unit formed by the reaction of a compound having two isocyanate groups and a compound having two hydroxy groups.

Examples of the compound having two isocyanate groups include a compound represented by the following formula (3):

$$O=C=N-R^4-N=C=O \qquad (3)$$

wherein $R^4$ represents a divalent organic group.

In formula (3), specific examples of $R^4$ (divalent organic group) include $(CH_2)_n$ (n is an integer of 1 to 20), a methyldiphenylene group, a methyldicyclohexylene group, a 3-methyl-3,5,5-trimethylcyclohexylene group, a dimethylphenylene group, a tolylene group, a phenylene group, a benzylidene group, a cyclohexylene group, and an isophorone group. When the divalent organic group is $(CH_2)_n$, n is preferably 2 to 10, and more preferably 3 to 8.

Examples of the compound having two hydroxy groups include alkylene glycol "$HO-(CH_2)_k-OH$" (k is 1 to 20, preferably 1 to 10, and more preferably 1 to 5), as well as a compound represented by the following formula (4):

$$HO-(CH_2CH_2O)_m-H \qquad (4)$$

wherein m is an integer of 1 to 50. In formula (4), m is preferably 1 to 30, more preferably 2 to 20, and particularly preferably 2 to 10.

The second macromolecular compound may be a homopolymer or a copolymer. When the second macromolecular compound is a copolymer, it may be a random polymer, a block polymer, or an alternating copolymer. The second macromolecular compound preferably has a linear structure or a non-crosslinked structure, from the standpoint of ease of penetrating through the ring of the host group in a skewering manner.

The molecular weight (e.g., weight average molecular weight) of the second macromolecular compound is not particularly limited, and can be set, for example, in a range equivalent to the molecular weight of macromolecular compounds obtained by ordinary radical polymerization.

The method for producing the second macromolecular compound is not particularly limited, and methods for producing known macromolecular compounds can be widely used. For example, the second macromolecular compound can be produced by polymerization reaction of a polymerizable monomer for forming the second macromolecular compound. When the second macromolecular compound is a vinyl resin mentioned above, the polymerizable monomer used in the polymerization reaction is a vinyl monomer mentioned above. Further, when the second macromolecular compound is a urethane resin mentioned above, the polymerizable monomer used in the polymerization reaction is, for example, a mixture of the compound having two isocyanate groups and the compound having two hydroxy groups.

In the method for producing the second macromolecular compound, when the second macromolecular compound is a vinyl resin mentioned above, known radical polymerization methods can be widely used. Further, in the method for producing the second macromolecular compound, when the second macromolecular compound is a urethane resin mentioned above, known polycondensation methods can be widely used.

In the macromolecular material, the second macromolecular compound can be obtained by polymerization simultaneously with the formation of the macromolecular material, as described later.

Macromolecular Material

The macromolecular material of the present invention comprises at least the first macromolecular compound and the second macromolecular compound, and the second macromolecular compound is formed to penetrate through the ring of the host group possessed by the first macromolecular compound in a skewering manner.

FIG. 1 schematically shows part of the structure of the macromolecular material of the present invention. In this figure, the macromolecular material contains a first macromolecular compound 1 and a second macromolecular compound 2, and the second macromolecular compound 2 penetrates through the ring of a host group 10, possessed by the side chain of the first macromolecular compound 1, in a skewering manner.

As can be seen from FIG. 1, in the macromolecular material of the present invention, the second macromolecular compound penetrates through the ring of the host group in a skewering manner, whereby the first macromolecular compound and the second macromolecular compound apparently form a crosslinked structure. In this crosslinked structure, the second macromolecular compound can slide in the ring of the host group; thus, it can be said that the macromolecular material forms "movable crosslinkage."

Since the macromolecular material of the present invention has a movable crosslinked structure, the first macromolecular compound and the second macromolecular compound are less likely to undergo phase separation, and both macromolecular compounds can be easily present uniformly in the macromolecular material. That is, even when the first macromolecular compound and the second macromolecular compound are hardly mixed with each other, in the macromolecular material of the present invention, movable crosslinkage using host groups facilitates the mixing of the first macromolecular compound and the second macromolecular compound. Specifically, even when the main chain of the first macromolecular compound and the main chain of the second macromolecular compound have the same structure or different structures, the first macromolecular compound and the second macromolecular compound can be easily mixed.

Further, due to its movable crosslinked structure, the macromolecular material of the present invention can also have excellent mechanical properties. In the macromolecular material of the present invention, the second macromolecular compound is slidable in the ring of the host group, which particularly improves the flexibility and toughness of the macromolecular material. Specifically, compared with the first macromolecular compound alone and the second macromolecular compound alone, flexibility and toughness are more improved. In addition, compared with a blended polymer obtained by simply mixing different types of macromolecular compounds without using host groups, flexibility and toughness are more improved. Specifically, compared with a blended polymer obtained by simply mixing a polymer (free of host groups) of polymerizable monomer 1B and the second macromolecular compound, flexibility and toughness are more improved.

Moreover, due to its movable crosslinked structure, the macromolecular material of the present invention can also have excellent processability. For example, when heat or shear is applied to the solid macromolecular material of the present invention, the macromolecular material is easily changed to a liquid state and can be thus easily molded into the desired shape. It is presumed that when heat or shear is applied to the macromolecular material of the present invention, molecular mobility increases, and one or both sides of the second macromolecular compound thus drop out of the rings of some of the multiple host groups, which causes the macromolecular material to soften or change to a liquid state.

In consideration of the above points, for example, depending on whether the solid macromolecular material of the present invention is changed to a liquid state by heating (however, at a temperature equal to or lower than the softening temperature of the first macromolecular compound, and equal to or lower than the softening temperature of the second macromolecular compound), it can be determined whether the second macromolecular compound penetrates through the rings of the host groups in a skewering manner. For example, when the solid macromolecular material of the present invention is changed to a liquid state by heating, it can be determined that the second macromolecular compound does not penetrate through the rings of the host groups in a skewering manner.

Furthermore, due to its movable crosslinked structure, the macromolecular material of the present invention also has excellent solubility in various solvents. Therefore, the macromolecular material of the present invention can also be used in a solution state.

In the macromolecular material of the present invention, the second macromolecular compound can penetrate through at least one host group per molecule, thereby exhibiting the effects of the present invention. In terms of enhancing the effects, the second macromolecular compound preferably sequentially penetrates through a plurality of host groups per molecule in a skewering manner.

As described above, one or both sides of the second macromolecular compound drop out of the rings of some of the host groups, thereby improving processability etc. In this respect, it is preferable that neither end of the second macromolecular compound has a blocking group, as shown in polyrotaxane etc. That is, both ends of the second macromolecular compound are preferably formed to be removable from the rings of the host groups.

In the macromolecular material of the present invention, the proportion of the first macromolecular compound and second macromolecular compound is not particularly limited. For example, the content ratio of the structural units contained in the second macromolecular compound can be set to 50 mol % or more, preferably 60 mol % or more, more preferably 70 mol % or more, and particularly preferably 80 mol % or more, based on the total amount of all of the structural units contained in the first macromolecular compound and all of the structural units contained in the second macromolecular compound. The content ratio of all of the structural units contained in the second macromolecular compound can be set to 99 mol % or less, and preferably 95 mol % or less, based on the total amount of all of the structural units contained in the first macromolecular compound and the structural units contained in the second macromolecular compound.

The content ratio of the host groups contained in the first macromolecular compound can be set to 0.01 mol % or more, preferably 0.05 mol % or more, more preferably 0.1 mol % or more, and particularly preferably 0.2 mol % or more, based on the total amount of all of the structural units contained in the first macromolecular compound and all of the structural units contained in the second macromolecular compound. Moreover, the content ratio of the host groups contained in the first macromolecular compound can be set to 10 mol % or less, preferably 8 mol % or less, more preferably 5 mol % or less, and particularly preferably 3 mol % or less, based on the total amount of all of the structural units contained in the first macromolecular compound and all of the structural units contained in the second macromolecular compound.

In the macromolecular material of the present invention, the main chain of the first macromolecular compound and the main chain of the second macromolecular compound may have the same or different structures. In particular, as described above, in the present invention, even when different types of polymers with main chains having different structures are combined together, a uniformly mixed material is obtained without separation of these polymers.

The first macromolecular compound contained in the macromolecular material of the present invention may be a single type or a mixture of two or more different types. Further, the second macromolecular compound contained in the macromolecular material of the present invention may be a single type or a mixture of two or more different types.

The macromolecular material of the present invention may contain various additives, as long as the effects of the present invention are not impaired. Examples of additives include light stabilizers, antioxidants, preservatives, surfactants, inorganic particles and other fillers, flame retardants, pigments, coloring agents, fungicides, and lubricants. The macromolecular material may contain one or two or more of these additives.

The macromolecular material of the present invention can be in various forms, such as powders, granules, pellets, plates, films, blocks, sheets, fibers, pastes, clays, solutions, and dispersions.

The macromolecular material of the present invention contains, for example, two or more types of polymers, which are less likely to be separated, and has excellent mechanical properties. Therefore, the macromolecular material of the present invention can be used for various applications, and is particularly suitable for various applications to which polymer alloys are applied. For example, the macromolecular material of the present invention can be widely applied to various fields, such as films, adhesives, coating agents, molding raw materials, paints, high-impact-resistance materials, thermoplastic and thermosetting alloy materials, polymeric membranes (porous membranes and phase separation membranes), optical materials, conductive and insulating materials for electronic materials, and medical devices.

2. Method for Producing Macromolecular Material

The macromolecular material of the present invention can be produced, for example, by a production method comprising polymerizing a polymerizable monomer in the presence of the first macromolecular compound. Hereinafter, this production method is referred to as "production method 1."

The first macromolecular compound used in production method 1 can be obtained by the method for producing a first macromolecular compound described above.

The polymerizable monomer used in production method 1 is a polymerizable monomer for forming the second macromolecular compound. Specifically, when the second macromolecular compound is a vinyl resin mentioned above, the polymerizable monomer used in the polymerization reaction contains a vinyl monomer mentioned above. Further, when the second macromolecular compound is a urethane resin mentioned above, the polymerizable monomer used in the polymerization reaction contains a mixture of a compound having two isocyanate groups and a compound having two hydroxy groups mentioned above.

When the polymerizable monomer used in production method 1 contains a vinyl monomer, examples of the vinyl monomer include the compound represented by formula (a1). Specific examples include (meth)acrylic acid, allylamine, maleic anhydride, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, n-octyl (meth)acrylate, N,N-dimethyl(meth)acrylamide, N,N-diethylacrylamide, N-isopropyl(meth)acrylamide, N-hydroxymethyl(meth)acrylamide, N-hydroxymethyl(meth)acrylate, 2-hydroxyethyl(meth)acrylamide, 2-hydroxyethyl(meth)acrylate, ethoxy-diethylene glycol acrylate, methoxy-triethylene glycol acrylate, methoxy-polyethylene glycol acrylate, and styrene. These can be used singly or in a combination of two or more.

When the polymerizable monomer used in production method 1 contains a vinyl monomer, the content ratio of the vinyl monomer in the polymerizable monomer is, for example, 50 mass % or more, preferably 80 mass % or more, more preferably 90 mass % or more, and particularly preferably 99 mass % or more.

On the other hand, when the polymerizable monomer used in production method 1 contains a mixture of a compound having two isocyanate groups and a compound having two hydroxy groups, the compound having two isocyanate groups is, for example, the compound represented by formula (3). The compound having two hydroxy groups is, for example, the alkylene glycol "HO—$(CH_2)_k$—OH" (k is 1 to 20, preferably 1 to 10, and more preferably 1 to 5) or the compound represented by formula (4).

When the polymerizable monomer used in production method 1 contains a mixture of a compound having two isocyanate groups and a compound having two hydroxy groups, the content ratio of the mixture in the polymerizable monomer is, for example, 50 mass % or more, preferably 80 mass % or more, more preferably 90 mass % or more, and particularly preferably 99 mass % or more.

In production method 1, the method of polymerizing a polymerizable monomer in the presence of the first macromolecular compound is not particularly limited, and known polymerization methods can be widely used. For example, the polymerization reaction can be performed by mixing a polymerizable monomer, the first macromolecular compound, and a polymerization initiator. Specifically, the first macromolecular compound and a polymerization initiator can be dissolved in a polymerizable monomer to prepare a solution, which is then heated or irradiated with light to perform polymerization. As a result, the target macromolecular compound can be obtained.

The polymerization initiator can be the same as the polymerization initiator that can be used in the production of the first macromolecular compound.

The polymerization reaction in production method 1 is preferably photopolymerization (e.g., UV polymerization) because the production of the macromolecular material is easy, and the polymerization reaction does not require the use of a solvent. Regarding the conditions of photopolymerization, for example, the temperature, irradiation time, etc. are not particularly limited, and can be the same as those of photopolymerization for producing known macromolecular compounds. For example, the temperature can be set to 15 to 40 degrees, and the UV irradiation time can be set to 1 minute to 1 hour.

In production method 1, the polymerizable monomer penetrates through the ring of the host group in a skewering manner while being polymerized. To be more specific, the polymerizable monomer is polymerized to extend the chain of the second macromolecular compound, which can thereby penetrate through the ring of the host group in a skewering manner.

The macromolecular material of the present invention can be produced not only by production method 1, but also by other various methods. For example, the macromolecular material of the present invention can be produced by a production method comprising mixing the first macromolecular compound and the second macromolecular compound, thereby allowing the second macromolecular compound to penetrate through the ring of the host group in a skewering manner (referred to as "production method 2").

The first macromolecular compound used in production method 2 can be obtained by the method for producing a first macromolecular compound described above. Further, the second macromolecular compound used in production method 2 can be obtained by the method for producing a second macromolecular compound described above.

In production method 2, the method of mixing the first macromolecular compound and the second macromolecular compound is not particularly limited. For example, a known mixing means can be used. For example, various commercially available mixing machines can be used to mix the first macromolecular compound and the second macromolecular compound. As a result of the mixing, the second macromolecular compound can penetrate through the ring of the host group in a skewering manner, thereby obtaining the target macromolecular material.

3. Macromolecular Compatibilizing Agent

The present invention also includes a macromolecular compatibilizing agent. The macromolecular compatibilizing agent of the present invention comprises a macromolecular compound having a ring host group. The macromolecular compound having a ring host group is the first macromolecular compound described above. The macromolecular compatibilizing agent can be used as a compatibilizing agent (macromolecular compatibilizing agent) when mixing macromolecules with each other.

Due to the use of the macromolecular compatibilizing agent, incompatible macromolecular compounds can be uniformly mixed. This is because another macromolecular compound can penetrate through the ring of the host group, as described above. For example, due to the use of the macromolecular compatibilizing agent, the first macromolecular compound and the second macromolecular compound, which are incompatible with each other, can be easily mixed uniformly.

Since the macromolecular compatibilizing agent can be easily mixed (made compatible) with macromolecular compounds that can penetrate through the ring of the host group (e.g., the second macromolecular compound described above), it enables blending of different types of polymers, which has been conventionally difficult. Therefore, the first macromolecular compound described above can be preferably used as a compatibilizing agent for producing mixed materials of different types of polymers. The use of the macromolecular compatibilizing agent is suitable as a method for mixing different types of macromolecular compounds with each other.

EXAMPLES

Below, the present invention is described in more detail with reference to Examples. However, the present invention is not limited to the embodiments of the Examples.

Example 1-1

A compound represented by the following formula (E1-1) was prepared as a host group-containing polymerizable monomer. The compound represented by formula (E1-1) was produced in the same manner as in Production Example 6 of PTL 2 mentioned above. The compound represented by formula (E1-1) was expressed as "PAcγCDAAmMe."

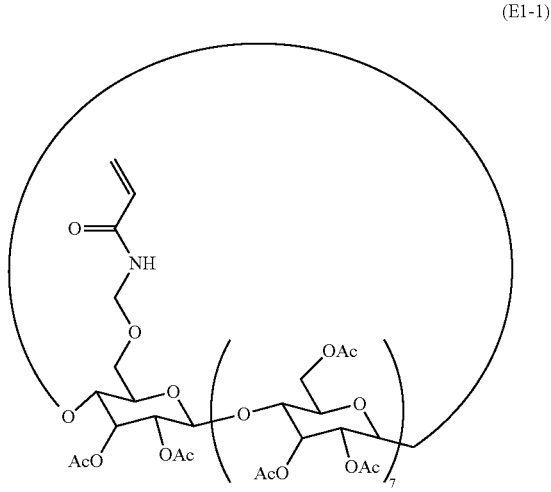

(E1-1)

Figure 2:
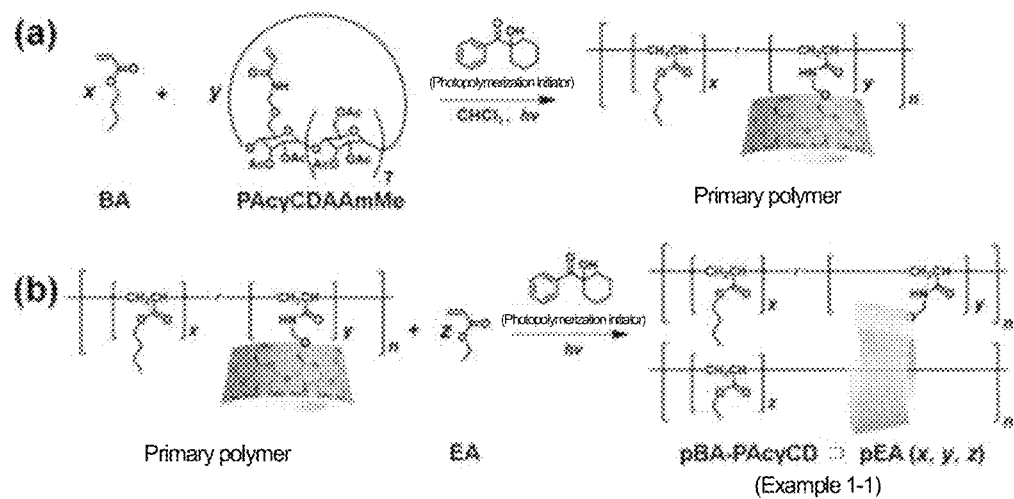
FIG. 2 is the reaction scheme of Example 1-1.

A macromolecular material was produced according to the reaction scheme shown in FIG. 2. First, PAcγCDAAmMe and butyl acrylate (BA) were added at a molar ratio of BA:PAcγCDAAmM=9.9:1 to chloroform (using 5 times the total mass of the monomer), followed by ultrasonic irradiation for 1 hour, thereby preparing reaction solution 1. As a photopolymerization initiator, 1-hydroxycyclohexyl phenyl ketone (0.5% of monomer equivalent) was dissolved in reaction solution 1, and photopolymerization was performed by UV irradiation (λ=253, 365 nm) for 2 hours. After polymerization, the chloroform was removed by distillation under reduced pressure at 80° C., followed by drying under reduced pressure at 80° C. for 12 hours, thereby obtaining a first macromolecular compound. The entire first macromolecular compound was added to ethyl methacrylate (MMA), followed by ultrasonic irradiation for 1 hour, thereby preparing reaction solution 2. EA was used so as to achieve a molar ratio of BA:PAcγCDAAmM: EA=9.9:1:89.1. As a photopolymerization initiator, 1-hydroxycyclohexyl phenyl ketone (0.2% of MMA equivalent) was dissolved in reaction solution 2, and photopolymerization was performed by UV irradiation (same wavelength as above) for 120 minutes. After polymerization, the resultant was dried under reduced pressure at 80° C. for 12 hours, thereby obtaining a macromolecular material. The obtained macromolecular material was expressed as "pBA-PAcγCD⊃pEA (x, y, z)," wherein x:y:z=9.9:1:89.1.

Comparative Example 1-1

0.625 mmol of BA was added to chloroform (using 5 times the total mass of the monomer), followed by ultrasonic irradiation for 1 hour. As a photopolymerization initiator, 1-hydroxycyclohexyl phenyl ketone was dissolved therein, and photopolymerization was performed by UV irradiation (λ=253, 365 nm) for 2 hours. After polymerization, the chloroform was removed by distillation under reduced pressure at 80° C., followed by drying under reduced pressure at 80° C. for 12 hours, thereby obtaining a polymer. The entire polymer was added to 5.63 mmol of EA, followed by ultrasonic irradiation for 1 hour. Then, the photopolymerization initiator (0.5% of EA equivalent) was dissolved to prepare a mixed liquid, and photopolymerization was performed by UV irradiation on the mixed liquid for 30 minutes, thereby obtaining a PBA/PEA mixture.

Comparative Example 1-2

Figure 3:
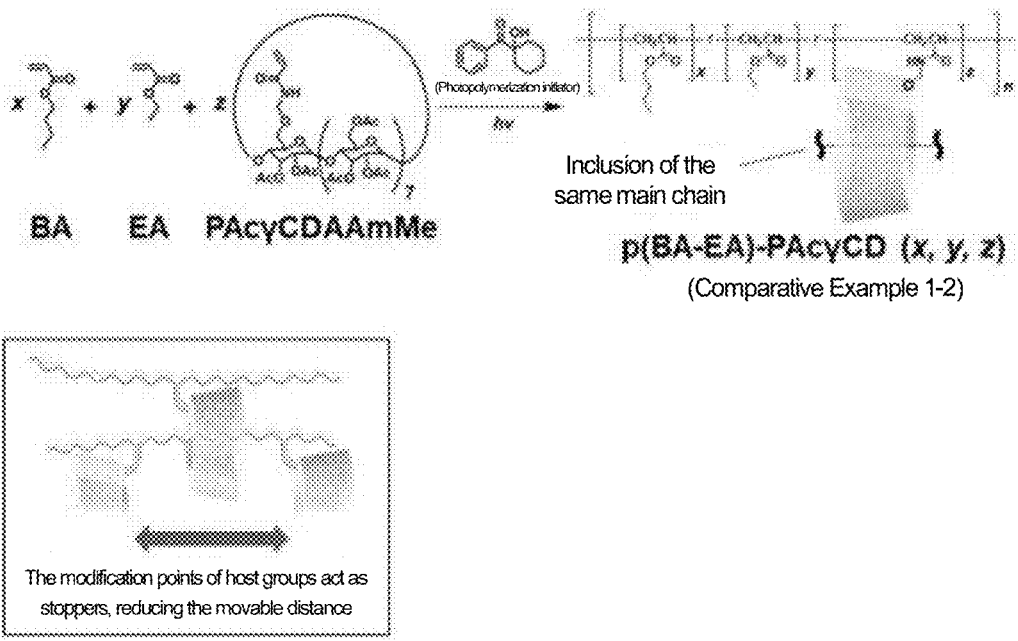
FIG. 3 is the reaction scheme of Comparative Example 1-2.

A macromolecular material was produced according to the reaction scheme shown in FIG. 3. PAcγCDAAmMe, BA, and EA were mixed at a molar ratio of BA:PAcγCDAAmM: EA=9.9:1:89.1, followed by ultrasonic irradiation for 1 hour, thereby preparing a reaction solution. As a photopolymerization initiator, 1-hydroxycyclohexyl phenyl ketone (0.2 equivalent of monomer equivalent) was dissolved in the reaction solution, and photopolymerization was performed by UV irradiation for 30 minutes, thereby obtaining a polymer. The obtained polymer was expressed as "p(BA-EA)-PAcγCD (x, y, z)," wherein x:y:z=9.9:1:89.1.

Example 2-1

Figure 4:
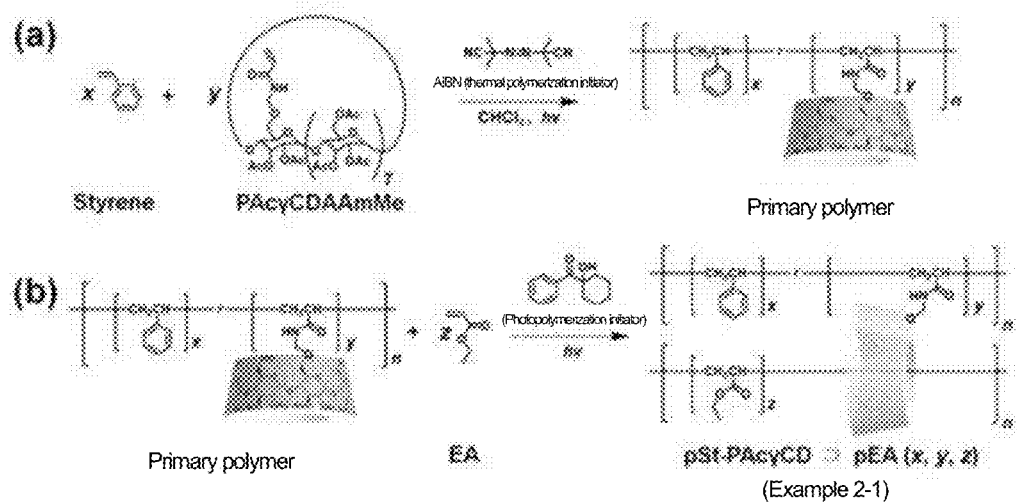
FIG. 4 is the reaction scheme of Example 2-1.

As shown in FIG. 4, a macromolecular material was obtained in the same manner as in Example 1-1, except that BA was changed to styrene to prepare reaction solution 1 (the solvent was changed from chloroform to toluene, and the polymerization initiator was changed to AIBN), and MMA was changed to EA (the UV irradiation time was also changed to 30 minutes) to prepare reaction solution 2. The obtained macromolecular material was expressed as "pSt-PAcγCD⊃pEA (x, y, z)" (x:y:z=19.8:1:79.2).

Comparative Example 2-1

A PSt/PEA mixture was obtained in the same manner as in Comparative Example 1-1, except that BA was changed to St.

Example 3-1

Figure 5:
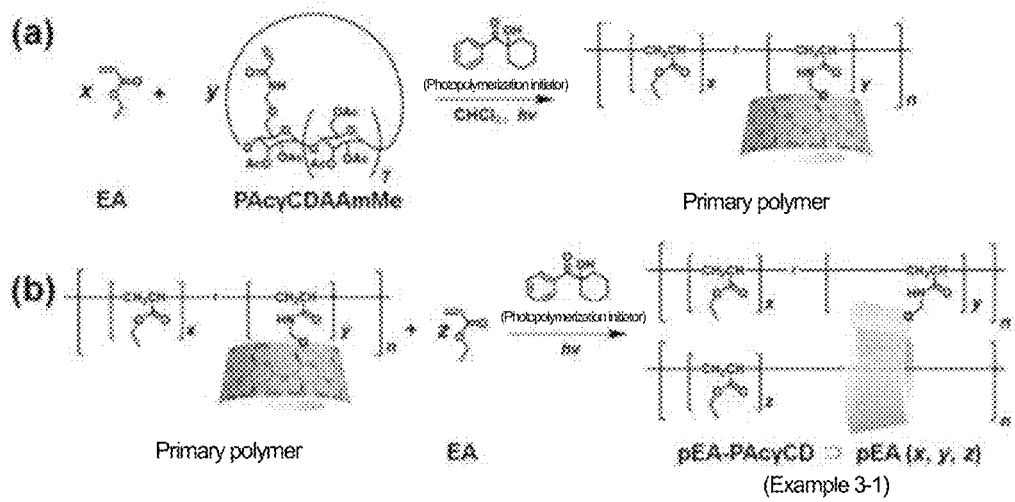
FIG. 5 is the reaction scheme of Example 3-1.

As shown in FIG. 5, a macromolecular material was obtained in the same manner as in Example 1-1, except that BA was changed to EA to prepare reaction solution 1. The obtained macromolecular material was expressed as "pEA-PAcγCD⊃pEA (x, y, z)" (x:y:z=19.8:1:79.2).

Comparative Example 3-1

A polyethyl acrylate homopolymer was prepared by radical polymerization of EA.

Comparative Example 3-2

65 µmol of PAcγCDAAmMe and 6.44 mmol of EA were mixed, followed by ultrasonic irradiation for 1 hour. As a photopolymerization initiator, 2.7 mg (13 µmol) of 1-hydroxycyclohexyl phenyl ketone was dissolved therein, and photopolymerization was performed by UV irradiation for 30 minutes, thereby obtaining a copolymer of EA and PAcγCDAAmMe.

Example 4-1

Figure 6:
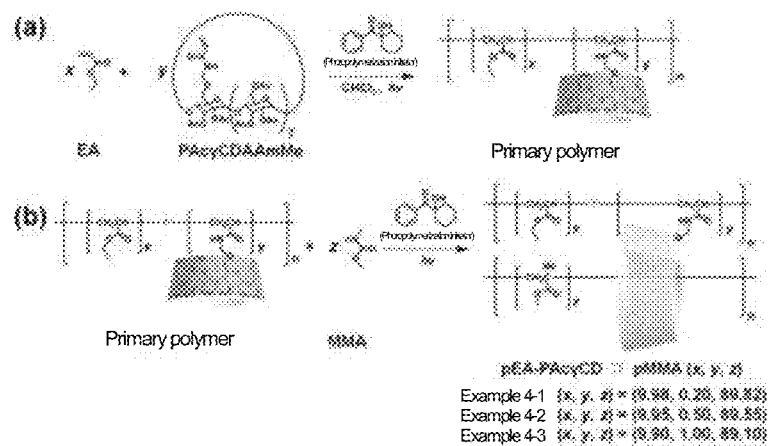
FIG. 6 is the reaction scheme of Example 4-1.

A macromolecular material was produced according to the reaction scheme shown in FIG. 6. First, PAcγCDAAmMe and ethyl acrylate (EA) were added at a molar ratio of EA:PAcγCDAAmM=9.98:0.2 to chloroform (using 5 times the total mass of the monomer), followed by ultrasonic irradiation for 1 hour, thereby preparing reaction solution 1. As a photopolymerization initiator, 1-hydroxycyclohexyl phenyl ketone (0.5% of monomer equivalent) was dissolved in reaction solution 1, and photopolymerization was performed by UV irradiation (λ=253, 365 nm) for 2 hours. After polymerization, the chloroform was removed by distillation under reduced pressure at 80° C., followed by drying under reduced pressure at 80° C. for 12 hours, thereby obtaining a first macromolecular compound. The entire first macromolecular compound was added to methyl methacrylate (MMA), followed by ultrasonic irradiation for 1 hour, thereby preparing reaction solution 2. MMA was used to achieve a molar ratio of EA:PAcγCDAAmM: MMA=9.98:0.2:89.82. As a photopolymerization initiator, 1-hydroxycyclohexyl phenyl ketone (0.2% of MMA equivalent) was dissolved in reaction solution 2, and photopolymerization was performed by UV irradiation (same wavelength as above) for 120 minutes. After polymerization, the resultant was dried under reduced pressure at 80° C. for 12 hours, thereby obtaining a macromolecular material. The obtained macromolecular material was expressed as "pEA-PAcγCD⊃pMMA (x, y, z)," wherein x:y:z=9.98:0.2:89.82.

Example 4-2

A macromolecular material was obtained in the same manner as in Example 4-1, except that reaction solution 1 was prepared so as to achieve a molar ratio of EA:PAcγCDAAmM=9.95:0.5, and reaction solution 2 was prepared so as to achieve a molar ratio of EA:PAcγCDAAmM:MMA=9.95:0.5:89.55. The obtained macromolecular material was expressed as "pEA-PAcγCD⊃pMMA (x, y, z)" (x:y:z=9.95:0.5:89.55).

Example 4-3

A macromolecular material was obtained in the same manner as in Example 4-1, except that reaction solution 1 was prepared so as to achieve a molar ratio of EA:PAcγCDAAmM=9.9:1, and reaction solution 2 was prepared so as to achieve a molar ratio of EA:PAcγCDAAmM:MMA=9.9:1:89.1. The obtained macromolecular material was expressed as "pEA-PAcγCD⊃pMMA (x, y, z)" (x:y:z=9.9:1:89.1).

Comparative Example 4-1

1.4 mmol of EA was added to chloroform (using 4 times the total mass of the monomer), followed by ultrasonic irradiation for 1 hour. As a photopolymerization initiator, 1-hydroxycyclohexyl phenyl ketone was dissolved therein, and photopolymerization was performed by UV irradiation (λ=253, 365 nm) for 2 hours. After polymerization, the chloroform was removed by distillation under reduced pressure at 80° C., followed by drying under reduced pressure at 80° C. for 12 hours, thereby obtaining a polymer. The entire polymer was added to 12.6 mmol of MMA, followed by ultrasonic irradiation for 1 hour. Then, the photopolymerization initiator (1% of MMA equivalent) was dissolved, and photopolymerization was performed by UV irradiation for 120 minutes, thereby obtaining a PEA/PMMA mixture.

Example 5-1

A macromolecular material was obtained in the same manner as in Example 4-1, except that ethyl acrylate (EA) was changed to n-butyl acrylate (BA) to prepare reaction solution 1. The obtained macromolecular material was expressed as "pBA-PAcγCD⊃pMMA (x, y, z)" (x:y:z=9.98:0.2:89.82).

Example 5-2

A macromolecular material was obtained in the same manner as in Example 4-2, except that ethyl acrylate (EA) was changed to n-butyl acrylate (BA) to prepare reaction solution 1. The obtained macromolecular material was expressed as "pBA-PAcγCD⊃pMMA (x, y, z)" (x:y:z=9.95:0.5:89.55).

Example 5-3

A macromolecular material was obtained in the same manner as in Example 4-3, except that ethyl acrylate (EA) was changed to n-butyl acrylate (BA) to prepare reaction solution 1. The obtained macromolecular material was expressed as "pBA-PAcγCD⊃pMMA (x, y, z)" (x:y:z=9.9:1:89.1).

Example 5-4

A macromolecular material was obtained in the same manner as in Example 5-1, except that reaction solution 1 was prepared so as to achieve a molar ratio of BA:PAcγCDAAmM=9.8:2, and reaction solution 2 was prepared so as to achieve a molar ratio of BA:PAcγCDAAmM:MMA=9.8:2:88.2. The obtained macromolecular material was expressed as "pBA-PAcγCD⊃pMMA (x, y, z)" (x:y:z=9.8:2:88.2).

Comparative Example 5-1

A PBA/PMMA mixture was obtained in the same manner as in Comparative Example 4-1, except that ethyl acrylate (EA) was changed to n-butyl acrylate (BA).

Example 6-1

A macromolecular material was obtained in the same manner as in Example 4-1, except that ethyl acrylate (EA) was changed to n-hexyl acrylate (HA) to prepare reaction solution 1. The obtained macromolecular material was expressed as "pHA-PAcγCD⊃pMMA (x, y, z)" (x:y:z=9.98:0.2:89.82).

Example 6-2

A macromolecular material was obtained in the same manner as in Example 4-2, except that ethyl acrylate (EA) was changed to n-hexyl acrylate (HA) to prepare reaction solution 1. The obtained macromolecular material was expressed as "pHA-PAcγCD⊃pMMA (x, y, z)" (x:y:z=9.95:0.5:89.55).

Example 6-3

A macromolecular material was obtained in the same manner as in Example 4-3, except that ethyl acrylate (EA) was changed to n-hexyl acrylate (HA) to prepare reaction solution 1. The obtained macromolecular material was expressed as "pHA-PAcγCD⊃pMMA (x, y, z)" (x:y:z=9.9:1:89.1).

Example 6-4

A macromolecular material was obtained in the same manner as in Example 5-1, except that reaction solution 1 was prepared so as to achieve a molar ratio of HA:PAcγCDAAmM=9.8:2, and reaction solution 2 was prepared so as to achieve a molar ratio of HA:PAcγCDAAmM:MMA=9.8:2:88.2. The obtained macromolecular material was expressed as "pHA-PAcγCD⊃pMMA (x, y, z)" (x:y:z=9.8:2:88.2).

Comparative Example 6-1

A PHA/PMMA mixture was obtained in the same manner as in Comparative Example 4-1, except that ethyl acrylate (EA) was changed to n-hexyl acrylate (HA).

Example 7-1

A macromolecular material was obtained in the same manner as in Example 4-3, except that methyl methacrylate (MMA) was changed to acrylic acid (AA) (the UV irradiation time was also changed to 30 minutes) to prepare reaction solution 2. The obtained macromolecular material was expressed as "pEA-PAcγCD ⊃ pAA (x, y, z)" (x:y:z=9.9:1:89.1).

Comparative Example 7-1

A PEA/PAA mixture was obtained in the same manner as in Comparative Example 4-1, except that methyl methacrylate (MMA) was changed to acrylic acid (AA).

Example 8-1

Figure 7:
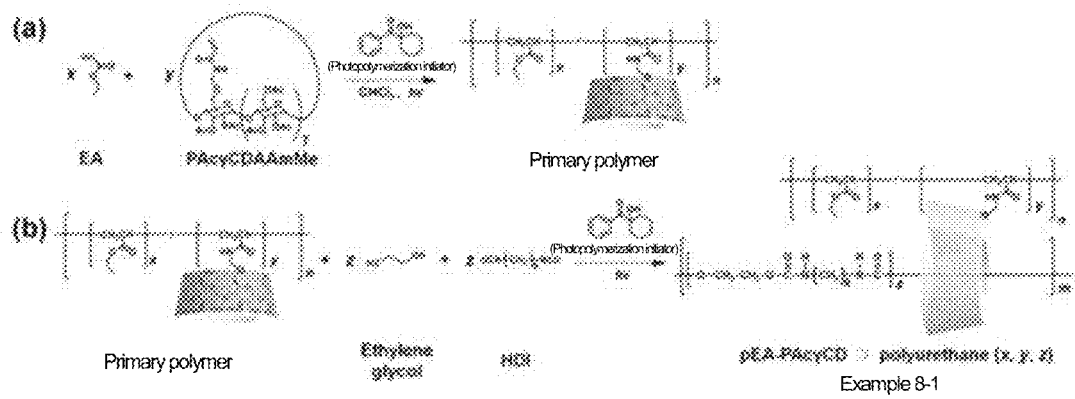
FIG. 7 is the reaction scheme of Example 8-1.

A macromolecular material was produced according to the reaction scheme shown in FIG. 7. First, PAcγCDAAmMe and ethyl acrylate (EA) were added at a molar ratio of EA:PAcγCDAAmM=20:1 to chloroform (using 4 times the total mass of the monomer), followed by ultrasonic irradiation for 1 hour, thereby preparing reaction solution 1. As a photopolymerization initiator, 1-hydroxycyclohexyl phenyl ketone (0.2% of monomer equivalent) was dissolved in reaction solution 1, and photopolymerization was performed by UV irradiation ($\lambda$=253, 365 nm) for 2 hours. After polymerization, the chloroform was removed by distillation under reduced pressure at 80° C., followed by drying under reduced pressure at 80° C. for 12 hours, thereby obtaining a first macromolecular compound. The entire first macromolecular compound was added to 0.57 g (9.2 mmol, 40 eq.) of ethylene glycol and hexamethylene diisocyanate (HDI, 9.2 mmol, 40 eq.), followed by ultrasonic irradiation for 1 hour, thereby preparing reaction solution 2. As a photopolymerization initiator, 2 mg of dibutyltin dilaurate (DBTDL) was dissolved in reaction solution 2, and thermal polymerization was performed by heating at 70° C. (90 minutes). After polymerization, the resultant was dried under reduced pressure at 80° C. for 12 hours, thereby obtaining a macromolecular material. The obtained macromolecular material was expressed as "pEA-PAcγCD ⊃ polyurethane (x, y, z)."

Comparative Example 8-1

1.4 mmol of EA was added to chloroform (using 4 times the total mass of the monomer), followed by ultrasonic irradiation for 1 hour. As a photopolymerization initiator, 1-hydroxycyclohexyl phenyl ketone was dissolved therein, and photopolymerization was performed by UV irradiation ($\lambda$=253, 365 nm) for 2 hours. After polymerization, the chloroform was removed by distillation under reduced pressure at 80° C., followed by drying under reduced pressure at 80° C. for 12 hours, thereby obtaining a polymer. The entire polymer was added to 9.2 mmol of ethylene glycol and 9.2 mmol of HDI, and 2 mg of dibutyltin dilaurate was dissolved, followed by UV irradiation for 30 minutes, thereby obtaining a PEA/polyurethane mixture.

Evaluation Results

Figure 8:
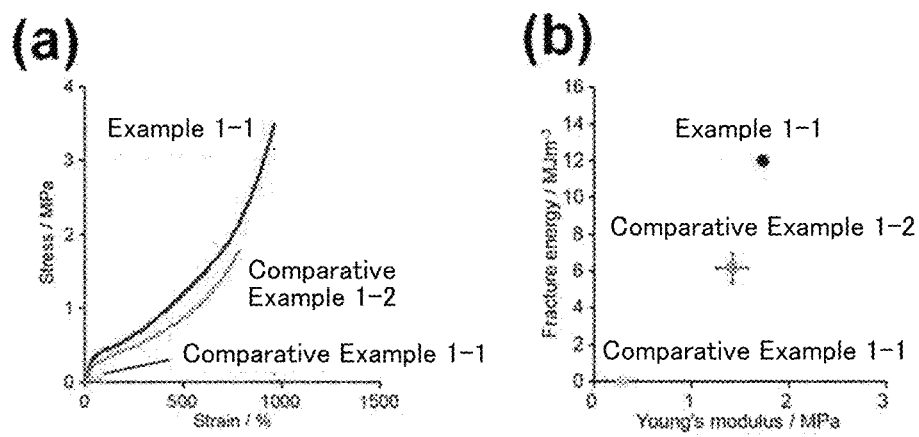
FIG. 8 shows the results of tensile tests on macromolecular materials obtained in the Examples.
Figure 9:
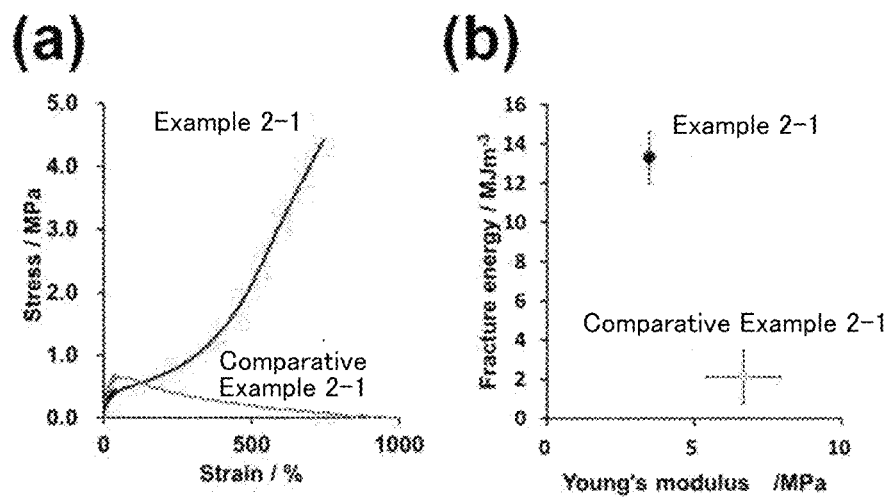
FIG. 9 shows the results of tensile tests on macromolecular materials obtained in the Examples.
Figure 10:
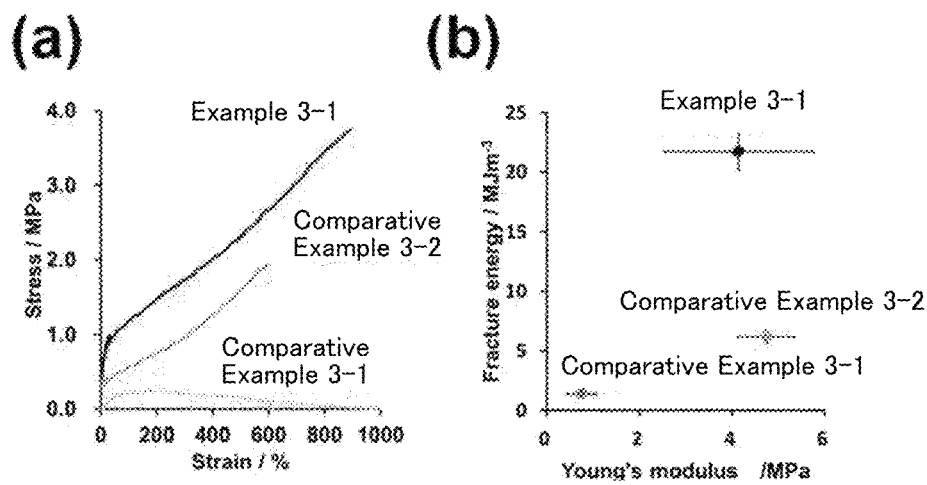
FIG. 10 shows the results of tensile tests on macromolecular materials obtained in the Examples.
Figure 11:
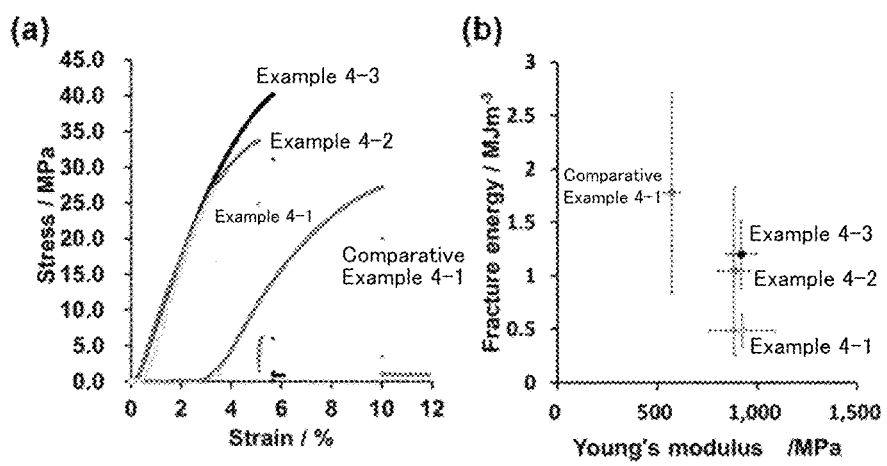
FIG. 11 shows the results of tensile tests on macromolecular materials obtained in the Examples.
Figure 12:
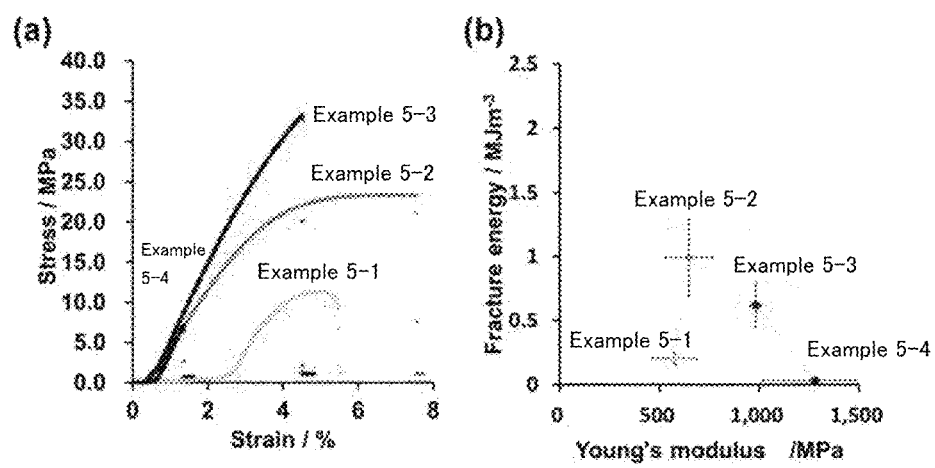
FIG. 12 shows the results of tensile tests on macromolecular materials obtained in the Examples.
Figure 13:
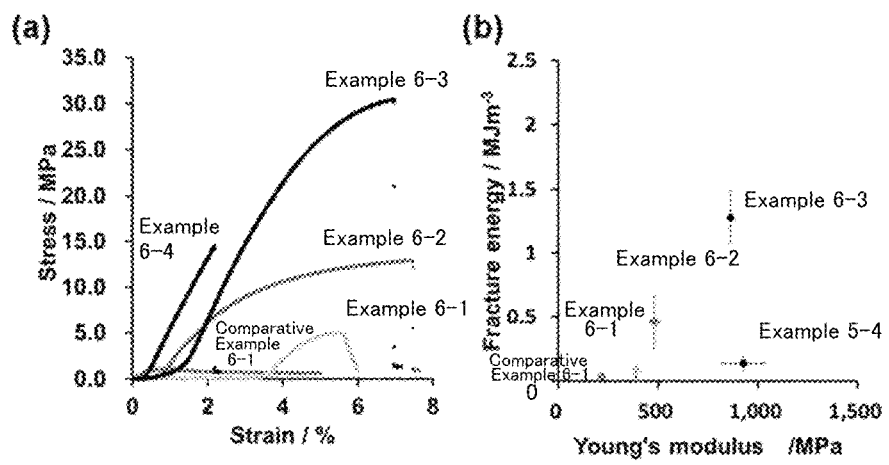
FIG. 13 shows the results of tensile tests on macromolecular materials obtained in the Examples.
Figure 14:
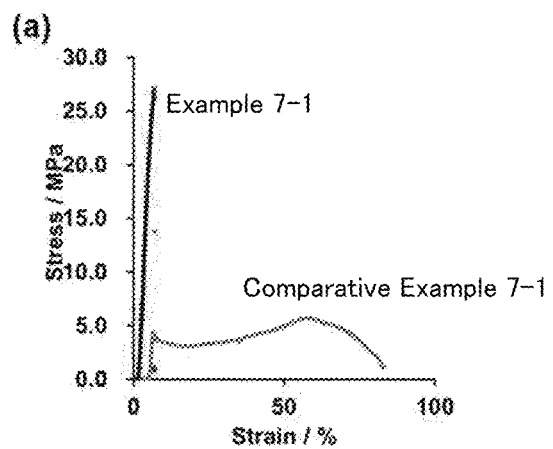
FIG. 14 shows the results of tensile tests on macromolecular materials obtained in the Examples.
Figure 15:
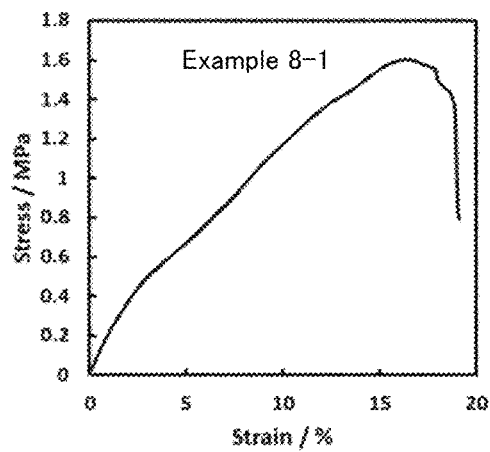
FIG. 15 shows the results of tensile tests on macromolecular materials obtained in the Examples.

FIGS. 8 to 15 show the results of tensile tests on the macromolecular materials obtained in the Examples, and the mixtures (or homopolymer or copolymer) obtained in the Comparative Examples. (a) shows rupture stress curves, and (b) shows correlation diagrams between fracture energy and Young's modulus (FIG. 8 shows Example 1-1, Comparative Example 1-1, and Comparative Example 1-2; FIG. 9 shows Example 2-1 and Comparative Example 2-1; FIG. 10 shows Example 3-1, Comparative Example 3-1, and Comparative Example 3-2; FIG. 11 shows Examples 4-1 to 4-3 and Comparative Example 4-1; FIG. 12 shows Examples 5-1 to 5-4; FIG. 13 shows Examples 6-1 to 6-4 and Comparative Example 6-1; FIG. 14 (only (a)) shows Example 7-1 and Comparative Example 7-2; and FIG. 15 shows Example 8-1).

From FIGS. 8 to 15, the macromolecular materials obtained in the Examples showed higher rupture stress and Young's modulus than those of the mixtures etc. of the Comparative Examples, and also showed higher rupture strain and fracture energy. It was thus found that the macromolecular materials obtained in the Examples were flexible and tough materials. In addition, the fracture energy tended to increase as the amount of host groups introduced increased. The mixture of Comparative Example 5-1 was in the form of oil droplets, and the separation between both polymers was significant. Further, Comparative Example 8-1 was in the form of a powder that was so brittle that a tensile test was impossible. Therefore, it was difficult to measure their physical properties. This can be considered to support the idea that the presence of host groups, through which the second macromolecular compound can penetrate, makes both polymers uniformly present in the material. The evaluation method of the tensile test was as follows.

In the p(BA-EA)-PAcγCD (x, y, z) obtained in Comparative Example 1-2, although a polymer chain penetrates through the host group ring, the movable distance of the penetrating polymer chain is small because other host groups act as stoppers, as shown in the inset diagram (image diagram in the frame) of FIG. 3. This suggests that the mechanical properties of Comparative Example 1-2 are inferior to those of Example 1-1 (also see FIG. 8). That is, like Comparative Example 1-2, a macromolecular material that has a host group, through the ring of which a polymer chain penetrates, but that does not have a first macromolecular compound or a second macromolecular compound, is considered to have inferior mechanical properties to those of a macromolecular material that has these compounds.

Tensile Test

Macromolecular materials (thickness: 1 mm) formed from the polymers obtained in the Examples and Comparative Examples were subjected to a stroke-load curve test (Autograph AGX-plus, produced by Shimadzu Corporation) to observe the rupture point of each macromolecular material. With this rupture point taken as the final point, the maximum stress applied until the final point was determined to be the rupture stress of the macromolecular material. This tensile test was performed with the bottom end of the macromolecular material fixed, and the upper end pulled at a tension rate of 1 mm/min or 5 mm/min (upward operation) (in Examples 1-1, 2-1, 2-3 and 8-1, the tension rate was 1 mm/min). Further, a value obtained by dividing the stroke at that time, that is, the maximum length when the macromolecular material was pulled, by the length of the macromolecular material before pulling was calculated as strain rate. In the stroke-load curve (stress-strain curve) test, materials showing high values for rupture stress or rupture strain (also simply referred to as "strain"), or both, can be determined to have excellent toughness and strength as macromolecular materials. In particular, materials showing high values for both rupture stress and strain can be determined to have excellent fracture energy.

Adhesion Test Example 1-1

Subsequently, according to the following procedure, an adhesion test was conducted between substrates using each macromolecular material as an adhesive layer. First, an aluminum substrate (ADC6000, 100×25×1 mm) and a nylon substrate (PA6.10, 100×25×3 mm) were washed with acetone and subjected to atmospheric pressure plasma treatment. 15 μL of reaction solution 2 prepared in Example 1-1 (however, containing 0.2% of 1-hydroxycyclohexyl phenyl ketone as a photopolymerization initiator) was applied to an area 12.5 mm from the edge of one substrate, and the other substrate was superimposed and clipped. Then, photopolymerization was performed by UV irradiation for 30 minutes (λ=253, 365 nm) by transmission from the translucent nylon substrate side, followed by drying under reduced pressure at 80° C. for 12 hours, thereby obtaining a laminate of the aluminum substrate and the nylon substrate.

Adhesion Test 1-2

A laminate was obtained in the same manner as in Adhesion Test Example 1-1, except that reaction solution 2 was changed to the mixed liquid prepared in Comparative Example 1-1.

Adhesion Test 1-3

A laminate was obtained in the same manner as in Adhesion Test Example 1-1, except that reaction solution 2 was changed to ethyl acrylate (containing 0.002 equivalent of 1-hydroxycyclohexyl phenyl ketone).

Adhesion Test 2-1

A laminate was obtained in the same manner as in Adhesion Test Example 1-1, except that reaction solution 2 was changed to the mixed liquid prepared in Comparative Example 2-1.

Figure 16:
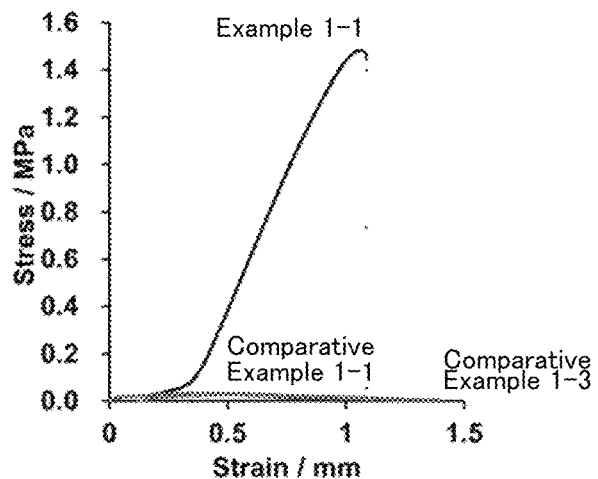
FIG. 16 shows the results of shear tensile tests on laminates obtained in adhesion tests.
Figure 17:
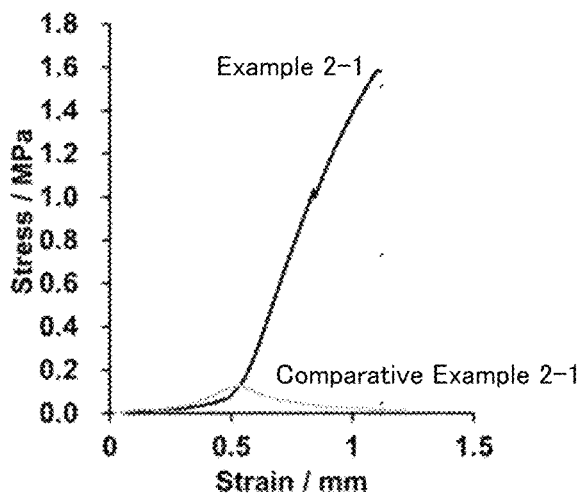
FIG. 17 shows the results of shear tensile tests on laminates obtained in adhesion tests.

FIGS. 16 and 17 show the results of shear tensile tests on the laminates obtained in the adhesion tests. The shear tensile tests (tension rate: 1 mm/min) were carried out in the same manner as in the tensile tests described above.

FIG. 16 showed that the laminate with the macromolecular material of Example 1-1 as an adhesive layer had superior rupture stress and rupture strain to those of Comparative Examples 1-1 and 1-3. FIG. 17 showed that the laminate with the macromolecular material of Example 2-1 as an adhesive layer had superior rupture stress and rupture strain to those of Comparative Example 2-1. It was also found that when the macromolecular materials of Examples 1-1 and 2-1 were used, monomer dripping from between the substrates was less likely to occur during bonding, compared with the Comparative Examples. This is considered to be due to the fact that the two types of polymers were not separated and were uniformly mixed.

The invention claimed is:

1. A macromolecular material comprising a first macromolecular compound having a ring host group, and a second macromolecular compound free of the host group,
    the host groups being covalently bonded to a side chain of the first macromolecular compound,
    the second macromolecular compound penetrating through the ring of the host group in a skewering manner, and
    neither end of the second macromolecular compound having a blocking group.

2. The macromolecular material according to claim 1, wherein the host group is a monovalent group formed by removing one hydrogen atom or hydroxy group from a cyclodextrin derivative, and
    the cyclodextrin derivative has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group.

3. A method for producing a macromolecular material, comprising polymerizing a polymerizable monomer in the presence of a first macromolecular compound having a ring host group,
    the host groups being covalently bonded to a side chain of the first macromolecular compound,
    the macromolecular material comprising the first macromolecular compound, and a second macromolecular compound free of the host group,
    the second macromolecular compound penetrating through the ring of the host group in a skewering manner.

4. The method for producing the macromolecular material according to claim 3, wherein the polymerizable monomer penetrates through the ring of the host group in a skewering manner while being polymerized.

5. A method for producing the macromolecular material according to claim 1, comprising mixing the first macromolecular compound and the second macromolecular compound, thereby allowing the second macromolecular compound to penetrate through the ring of the host group in a skewering manner.

6. A method for producing a macromolecular material, comprising polymerizing a polymerizable monomer in the presence of a first macromolecular compound having a ring host group,
    the macromolecular material comprising the first macromolecular compound, and a second macromolecular compound free of the host group,
    the second macromolecular compound penetrating through the ring of the host group in a skewering manner,
    the host group being a monovalent group formed by removing one hydrogen atom or hydroxy group from a cyclodextrin derivative, and
    the cyclodextrin derivative having a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group.

7. The method for producing the macromolecular material according to claim 6, wherein the polymerizable monomer penetrates through the ring of the host group in a skewering manner while being polymerized.

* * * * *